(12) United States Patent
Malki

(10) Patent No.: US 8,531,933 B2
(45) Date of Patent: Sep. 10, 2013

(54) SYNC MARK CORRECTION FOR HOLOGRAPHIC DATA PAGES

(75) Inventor: Oliver Malki, Fuetzen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 305 days.

(21) Appl. No.: 12/315,567

(22) Filed: Dec. 4, 2008

(65) Prior Publication Data

US 2009/0147654 A1    Jun. 11, 2009

(30) Foreign Application Priority Data

Dec. 11, 2007   (EP) .................................... 07122928

(51) Int. Cl.
*G11B 7/00*   (2006.01)
(52) U.S. Cl.
USPC ........................................................ 369/103
(58) Field of Classification Search
USPC ........................................................ 369/103
See application file for complete search history.

(56) References Cited

U.S. PATENT DOCUMENTS

| | | | |
|---|---|---|---|
| 7,116,626 B1 | 10/2006 | Woods et al. | |
| 2003/0231569 A1* | 12/2003 | Tonami et al. | 369/53.34 |
| 2004/0001400 A1* | 1/2004 | Amble et al. | 369/44.26 |
| 2006/0133243 A1* | 6/2006 | Tonami et al. | 369/47.48 |
| 2008/0019251 A1* | 1/2008 | Choi et al. | 369/103 |
| 2008/0297865 A1* | 12/2008 | Hara et al. | 359/12 |

FOREIGN PATENT DOCUMENTS

| | | |
|---|---|---|
| DE | 102004053071 | 5/2006 |
| EP | 1701341 | 9/2006 |
| EP | 1808855 | 7/2007 |

OTHER PUBLICATIONS

Search Report dated Mar. 20, 2008.

\* cited by examiner

*Primary Examiner* — Adam R Giesy
(74) *Attorney, Agent, or Firm* — Myers Wolin, LLC

(57) ABSTRACT

The presented invention relates to a method for reading data from a data page from an optical data storage medium, e.g. a holographic storage medium and to an apparatus for performing this method. At least one missing or wrong positioned sync mark on a read data page is identified and its corrected position is estimated. The estimated corrected sync mark position is used for further processing.

7 Claims, 5 Drawing Sheets

SYNC MARK CORRECTION FOR HOLOGRAPHIC DATA PAGES

This application claims the benefit, under 35 U.S.C. §119 of EP Patent Application 07122928.0 filed Dec. 11, 2007.

FIELD OF THE INVENTION

The present invention relates to a method for reading data from a data page for optical data storage in an optical storage system, e.g. a holographic storage system, including the correction of missing or wrong positioned sync marks, and to an apparatus for reading from an optical storage medium performing this method.

The invention is described below using a holographic storage system as an example. It is apparent to a person skilled in the art that the invention is applicable within other optical storage systems.

BACKGROUND OF THE INVENTION

In holographic data storage digital data are stored by encoding the interference pattern produced by the superposition of two coherent laser beams, where one beam, the so-called 'object-beam', is modulated by a spatial light modulator (SLM) and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recoding. This results in the reconstruction of the recorded object beam.

One advantage of holographic data storage is an increased data capacity. Contrary to conventional optical storage media, the volume of the holographic storage medium is used for storing information, not just a single or few two-dimensional layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light intensity variations, i.e. a two-dimensional binary array or an array of grey values, which code multiple bits. Data pages consisting of patterns showing different phases can also be used. This allows achieving increased data rates in addition to the increased storage density. The data page is imprinted onto the object beam by the SLM and detected with a detector array.

Data pages include synchronization marks, also referred to as sync marks, to determine the exact scaling factor from the SLM to the detector and to correct image distortion. Sync marks usually consist of a specific bit pattern, which is known and can be identified clearly by the reading apparatus. For any holographic data storage system the correct sync mark detection is essential for a successful demodulation procedure. As the scaling factor and the image distortion can vary locally, sync marks are usually distributed over the entire data page. If the sync mark detection fails in a part of the data page then in most cases the demodulation will also fail in this region. Due to defects in the holographic material or distortions such as detector noise the correct detection of a local sync mark may fail.

SUMMARY OF THE INVENTION

It is an object of the invention to propose a method for detecting such failures and/or correcting wrong positioned or missing sync marks. Readout is improved by using estimated sync marks.

According to the invention, the method for reading data from a data page from an optical data storage medium has the steps of:
  identifying at least one missing or wrong positioned sync mark on a read data page,
  estimating a corrected sync mark position, and
  using the estimated corrected sync mark position for further processing.

According to this method, wrong positioned or missing sync marks can be identified even if a number of sync mark detections failed. Nevertheless, it is assumed that most of the sync marks are detected correctly to provide a basis for the calculation of the estimated corrected sync mark position. Using the proposed sync mark correction allows to determine image distortion and locally varying scaling factors on a data page reliably. The method is numerically simple and efficient. It can be implemented independent from the underlying modulation scheme of a data page. After the replacement the possibility to demodulate the data correctly in the region of the formerly wrong positioned sync mark increases. The bit error rate is reduced.

Advantageously, the method is used for reading from a holographic data storage medium. In a holographic data storage system, data are stored using two-dimensional data pages. In this case, it is of particular importance to determine image distortion and locally varying scaling factors previous to demodulation. To perform this determination reliably, correct sync mark positions are needed. Increasing the accuracy of the sync mark detection increases the reliability of the readout process.

Advantageously, further data processing according to the invention includes data detection in the region of the missing or wrong positioned sync mark using the estimated sync mark position. Data is read out reliably essentially independent from wrong positioned or missing sync marks.

Favourably, wrong positioned or missing sync marks are corrected by estimating their correct position by interpolating sync marks from corresponding rows and/or columns. Sync mark positions are estimated, e.g. by the intersection of two regression curves of the corresponding row and column. This leads to an accurate estimation of the corrected sync mark position.

Advantageously, the corrected sync mark position is estimated by interpolating sync marks from a set of sync marks nearby. Within a defined area around a wrong positioned or missing sync mark, other sync marks are used to determine the correct position of the wrong positioned or missing sync mark. Consequently, local differences of the optical path and of the optical elements are considered during estimation of the corrected sync mark position.

Favourably, a measure for the deviation of a sync mark position from its expected position is calculated to detect wrong positioned or missing sync marks. The measure is calculated, for example, using regression curves of the corresponding row or column, or the measure is calculated using other sync marks within a defined area around an estimated sync mark position. The mathematical measure is calculated, for example, using quadratic filtering of the read out sync marks or using the statistical variance of the sync mark positions. The mathematical measure can be adapted to an algorithm which fits best to the system configuration. The invention is flexible and adjustable to the basic conditions.

Favourably, a data area around a wrong positioned sync mark is shifted according to a sync mark deviation. This improves read out accuracy.

According to a further aspect of the invention an apparatus for reading a data storage media uses a method according to the invention for detecting missing or wrong positioned sync marks and correcting the sync mark positions.

Favourably, in a holographic storage medium the sync marks have a light intensity distribution and a spatial frequency distribution similar to the light intensity and spatial frequency distribution of the data blocks. A similar light intensity and spatial frequency distribution over the whole data page leads to a more uniform utilization of the holographic material resulting in a higher storage capacity. Using the method for sync mark detection according to the invention, the light intensity of the sync marks can be reduced and adapted to the light intensity distribution of the whole data page. The sync mark detection errors resulting from the lower light intensity of the sync marks are corrected by the invention.

For better understanding the invention shall now be explained in more detail in the following description with reference to the figures. It is understood that the invention is not limited to this exemplary embodiment and that specified features can also expediently be combined and/or modified without departing from the scope of the present invention.

DETAILED DESCRIPTION OF PREFERRED EMBODIMENTS

Figure 1:
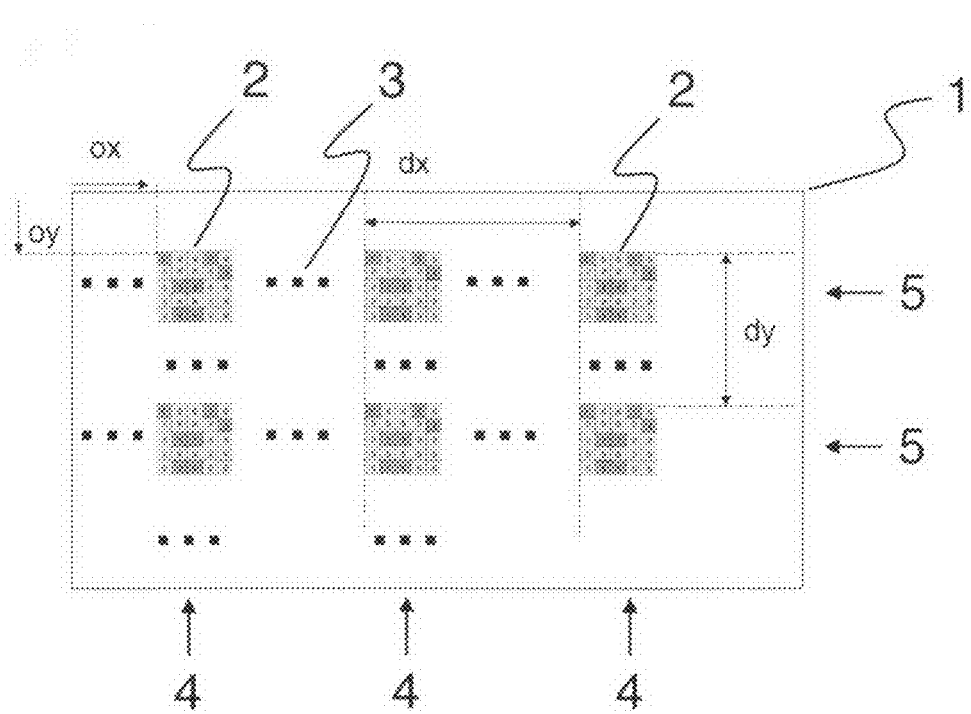
FIG. 1 schematically shows a data page including sync marks and data blocks.

FIG. 1 schematically depicts a part of a data page 1 including two rows 5 and three columns 4 of sync marks 2. A sync mark 2 is composed of e.g. a 5×5 pixel pattern. Different sync marks 2 can be used and distributed over the data page 1 to put additional information into the sync marks 2. The sync mark detection is realized e.g. by searching for local maxima in the correlation of the read out data page and the sync mark pattern. The distance between two adjacent sync mark columns 4 is dx. The distance between two adjacent sync mark rows 5 is dy. The offset from the upper left corner of the data page 1 to the first sync mark position is ox and oy, respectively. Data blocks 3 are indicated schematically by dots.

Figure 2:
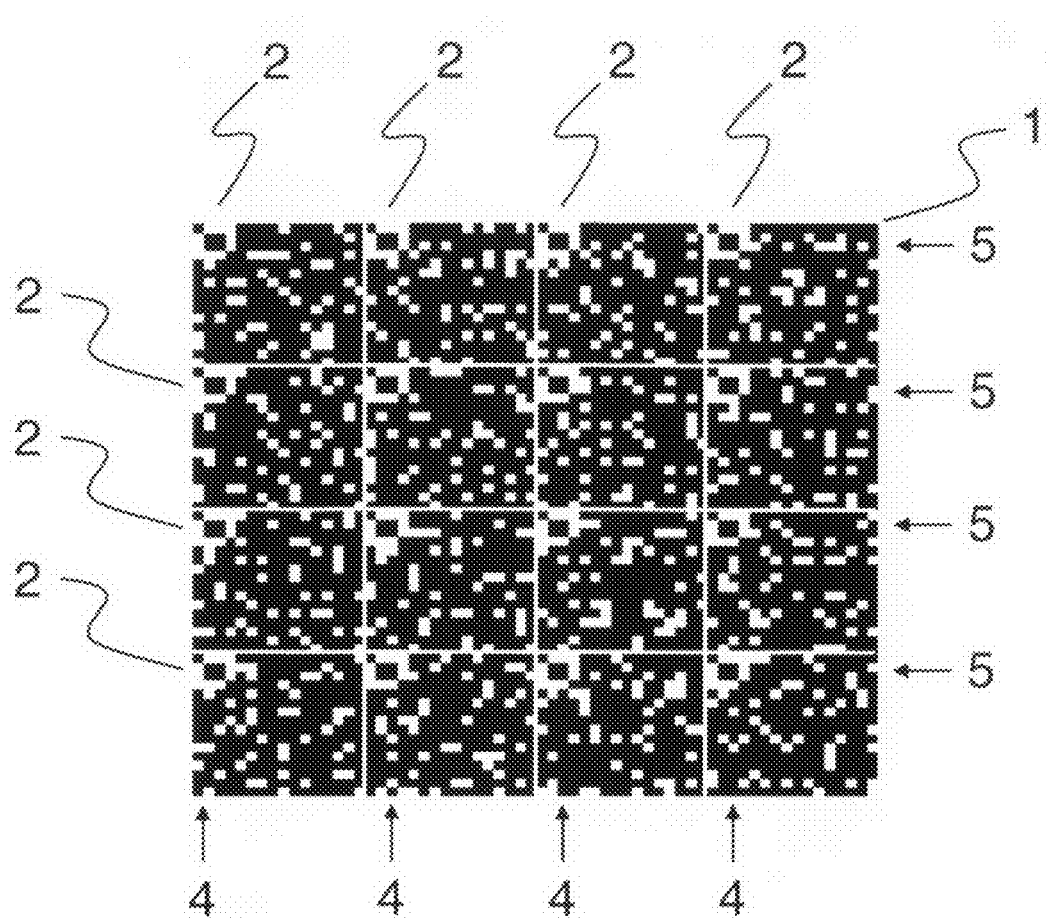
FIG. 2 shows a data page, including four rows and four columns of sync marks.

FIG. 2 shows an example of a part of a data page 1 as a combination of digital patterns. A pattern like this is imprinted on an SLM during writing. Sync marks 2 have a specific shape and can be retrieved from the figure. This data page 1 contains four sync marks 2 in a row 5 and four sync marks in a column 4. In this example, sync marks 2 are equally spaced. The positions of the sync marks 2 on a data page 1 and the pattern of the sync marks 2 are also known in advance by the reading apparatus. The white lines are for clarification only and divide the data page 1 into subpages, each one containing 4×4 blocks. One of the blocks is a sync block 2.

Figure 3:
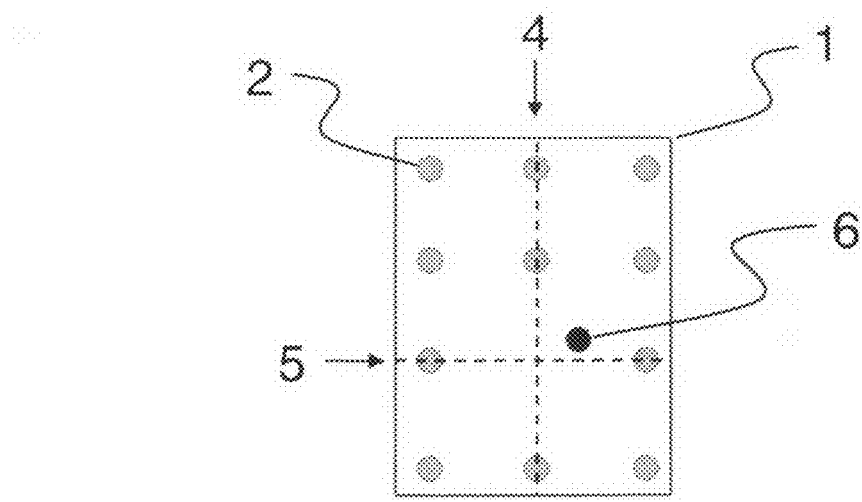
FIG. 3 shows a part of a data page, including one wrong positioned sync mark.
Figure 4:
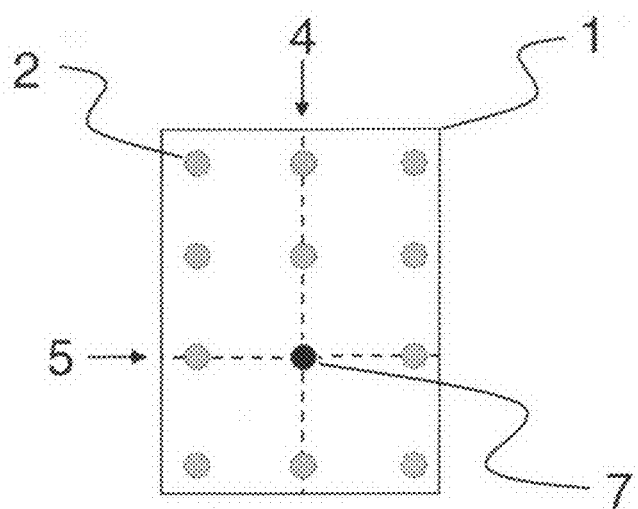
FIG. 4 shows a part of a data page, including the corrected position of a sync mark.

FIG. 3 schematically shows a part of a data page 1, including sync marks 2 arranged in rows 5 and columns 4. The dotted lines indicate a row 5 and a column 4 of sync marks. They are not the same as the lines indicated in FIG. 2 showing the subpages. There is one wrong positioned sync mark 6 indicated. The correct detection of the sync mark failed. Sync marks in row 5 and column 4 are assumed to be detected correctly. The expected position of sync mark 6 is at the intersection point of the interpolation curves of sync marks in row 5 and column 4. The distance of a sync mark 6 from the expected position for this sync mark can be expressed by a mathematical measure, e.g. the variance. If this measure exceeds a certain limit, it is assumed that the sync mark detection failed. In this case, the corrected position of the sync mark is estimated to be at the intersection point of the interpolation curves of the correctly detected sync marks. The sync mark which was identified to be detected at a wrong position is shifted to this intersection point. FIG. 4 shows the replacement of the sync mark 7.

Figure 5:
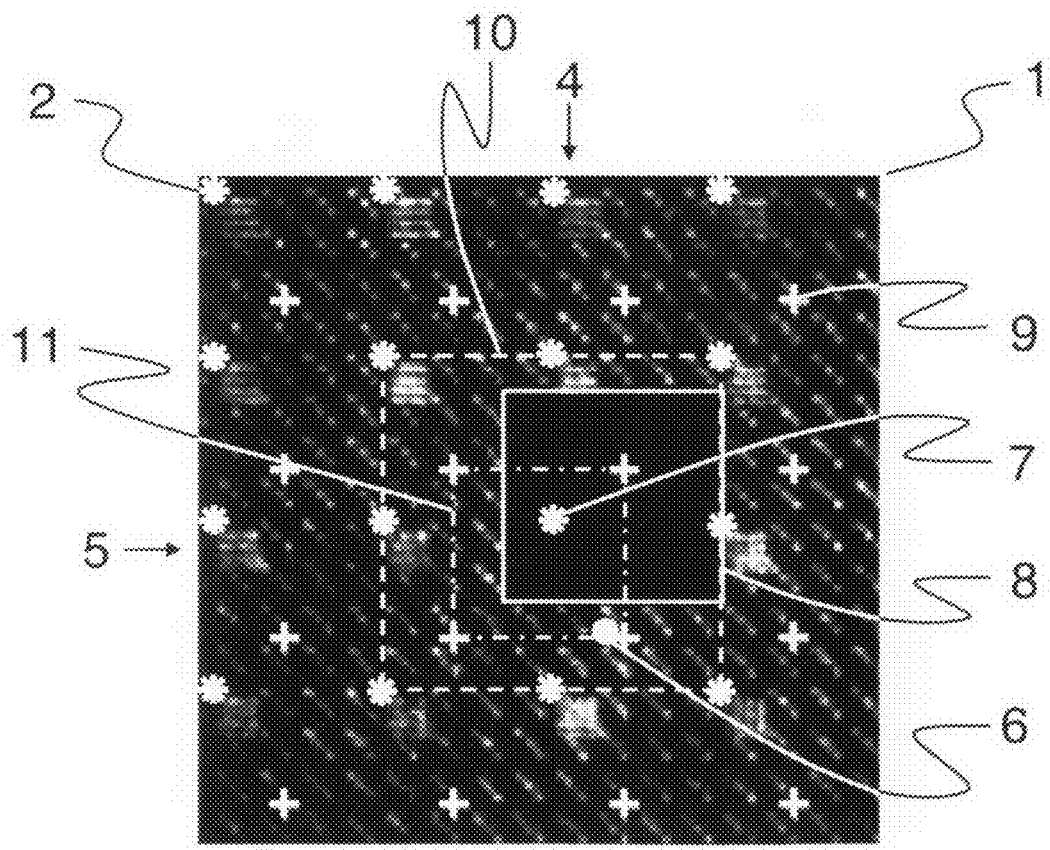
FIG. 5 shows an example of the replacement of a wrong positioned or missing sync mark within a data page.

FIG. 5 shows an example of the detected data pattern depicted in FIG. 2. Sync marks 2 can be identified in the picture as bright areas. Generally, sync marks 2 have a higher ratio between 'on' and 'off' pixels compared to a data block 3. Nevertheless, on a detected data page, they cannot be identified by eye. The data page 1 shown in FIG. 5 uses sync marks 2 with an even higher light intensity compared to the data blocks 3 for demonstration purposes only.

The distance between two adjacent sync marks 2 is known in advance. Therefore, a grid 9 can be established on a data page 1. Between four neighbouring grid points 9, a sync mark 2 has to be detected. In case a part of the data page 8 is not detected correctly, also the sync mark detection within this area fails. This can be caused e.g. due to a bad signal-to-noise ratio (SNR), local defects in the holographic material or local defects of the detector or the optical apparatus. Without using the method according to the invention, in the area 11 between four neighbouring grid points 9 the sync mark 7 is not readable. The sync mark is determined at a data block 6 which looks most similar to a sync pattern. All four subpages 10 using the erroneous sync mark 6 as a boundary show significant read errors. In contrast, using a corrected sync mark 7 according to the invention allows reading all data within the four surrounding subpages 10 except for the data in the defect region 8. A significantly reduced error rate arises.

Figure 6:
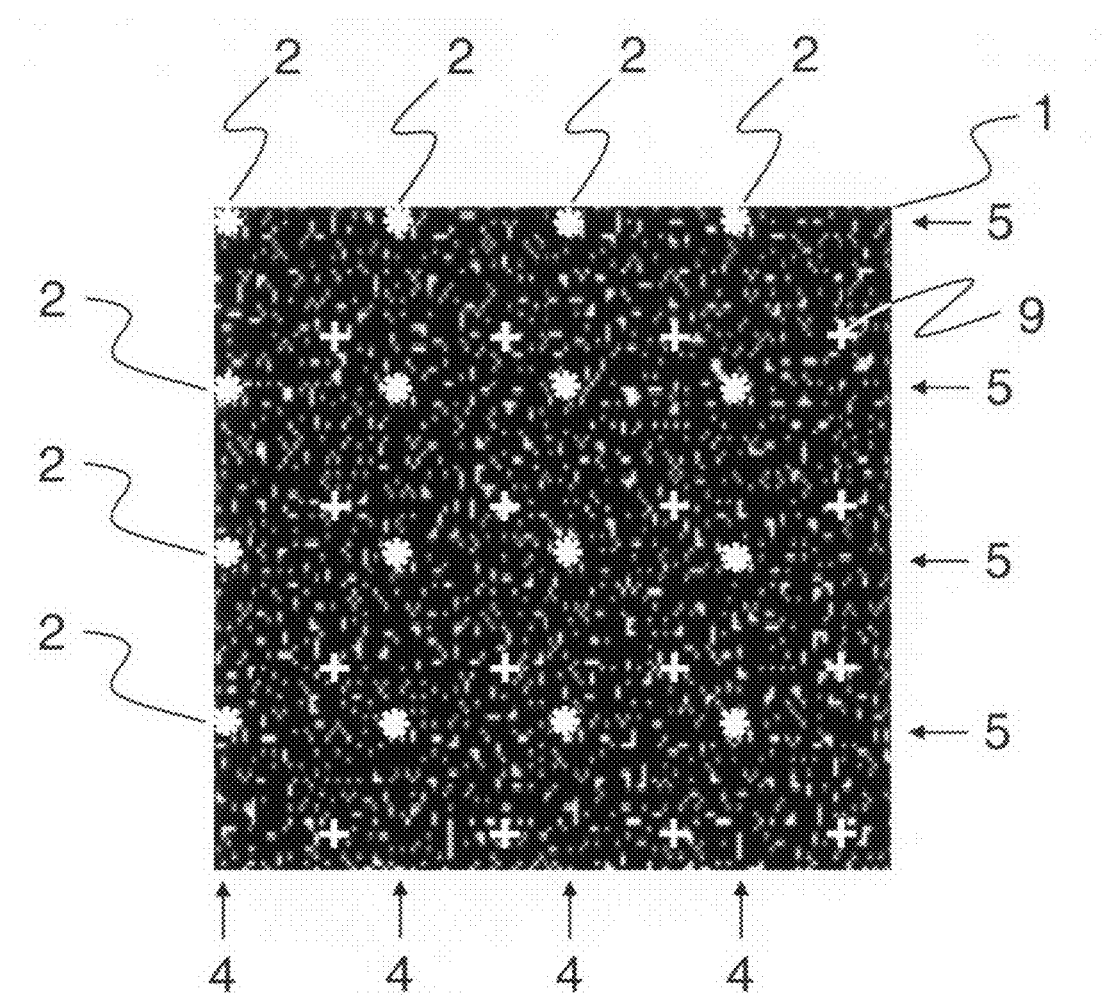
FIG. 6 shows a read out data page that has sync marks with a light intensity similar to the light intensity of the data page FIG. 7 schematically shows an apparatus for reading and/or recording a holographic storage medium.

FIG. 6 shows a data page 1 using sync marks 2 with a light intensity and a spatial frequency distribution similar to the light intensity and spatial frequency distribution of the whole data page 1. The sync marks 2 can not be identified by eye. The SNR on the sync mark 2 is worse compared to the SNR of the sync marks 2 shown in FIG. 5.

Figure 7:
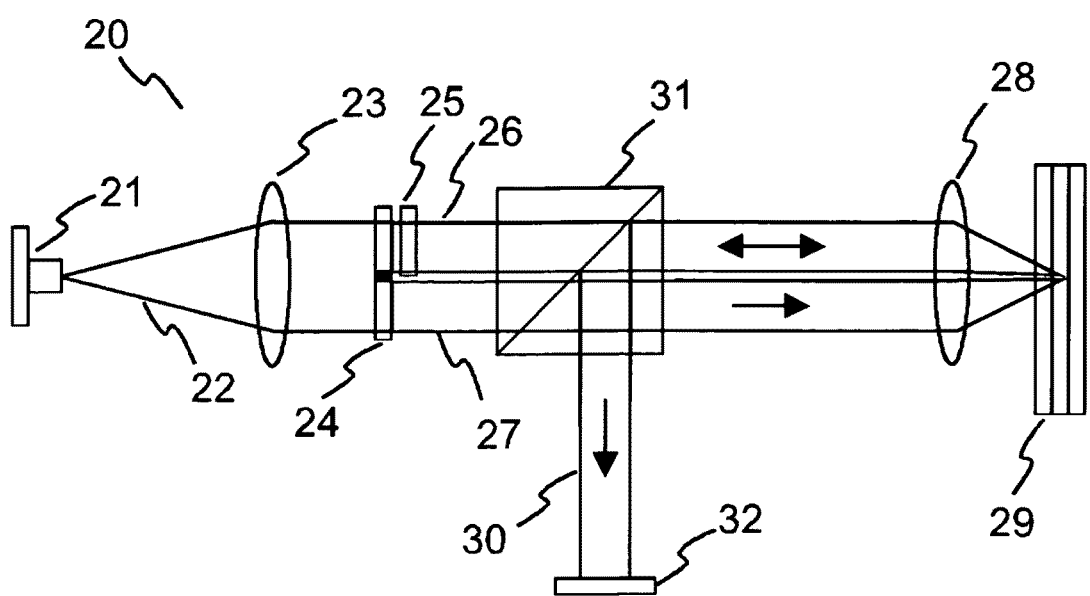

In FIG. 7 an apparatus 20 for reading and/or recording a holographic storage medium 29 is shown schematically. A source of coherent light, e.g. a laser diode 21, emits a light beam 22, which is collimated by a collimating lens 23. The light beam 22 is then divided into two separate light beams 26, 27. In the example the division of the light beam 22 is achieved using a first beam splitter 24. However, it is likewise possible to use other optical components for this purpose. A spatial light modulator (SLM) 25 modulates one of the two beams, the so called "object beam" 26, to imprint a two-dimensional data pattern. Both the object beam 26 and the further beam, the so called "reference beam" 27, are focused into a holographic storage medium 29, e.g. a holographic disk or card, by an objective lens 28. At the intersection of the object beam 26 and the reference beam 27 an interference pattern appears, which is recorded in a photo-sensitive layer of the holographic storage medium 29.

The stored data are retrieved from the holographic storage medium 29 by illuminating a recorded hologram with the reference beam 27 only. The reference beam 27 is diffracted by the hologram structure and produces a copy of the original object beam 26, the reconstructed object beam 30. This reconstructed object beam 30 is collimated by the objective lens 28 and directed onto a two-dimensional array detector 32, e.g. a CCD-array, by a second beam splitter 31. The array detector 32 allows to reconstruct the recorded data.

What is claimed is:

1. A method for reading data from a two-dimensional data page from an optical data storage medium, wherein two-dimensional sync marks are detected from the data page, the method comprising:
    reading out a data page;
    determining expected position of the sync marks;
    detecting sync mark like data blocks in the read out data page and assuming them as read out sync marks;
    calculating a measure for the deviations of the read out sync marks and the corresponding expected position of the sync marks;
    identifying at least one sync mark read out at a wrong position when the calculated measure of the deviation is above a certain predefined value
    estimating a corrected sync mark position of the sync mark read out at a wrong position; and
    using the estimated corrected sync mark position for further processing.

2. The method according to claim 1, wherein the method is used for reading from a holographic data storage medium.

3. The method according to claim 1, wherein the further data processing include data detection in the region of the sync mark read out at a wrong position using the estimated corrected sync mark position.

4. The method according to claim 1, wherein the estimated corrected sync mark position is estimated by interpolating sync marks from corresponding rows and/or columns.

5. The method according to claim 1, wherein the estimated corrected sync mark position is estimated by interpolating sync marks from a set of sync marks nearby.

6. The method according to claim 1, wherein a data area around a sync mark read out a wrong position is shifted according to a sync mark deviation.

7. An apparatus for reading a two-dimensional data page from an optical data storage medium, the apparatus comprising:
    a coherent light source for illuminating a reference beam to the optical data storage medium; and
    a two-dimensional array detector for reconstructing data from an object beam produced by diffraction of the reference beam by the optical data storage medium;
    wherein two-dimensional sync marks are detected from the data page, wherein the detector is adapted to perform:
    determining expected position of the sync marks;
    detecting sync mark like data blocks in the read out data page and assuming them as read out sync marks;
    calculating a measure for deviations of the read out sync marks and the corresponding expected positions of the sync marks;
    identifying at least one sync mark read out at a wrong position when the calculated measure of the deviation is above a certain predefined value;
    estimating a corrected sync mark position of the sync mark read out at a wrong position; and
    using the estimated corrected sync mark position for further processing.

* * * * *